United States Patent [19]
Janssen

[11] Patent Number: 5,202,580
[45] Date of Patent: Apr. 13, 1993

[54] ANTI-TAMPERING MAGNET FOR AUTOMOBILE IGNITION LOCK

[75] Inventor: David Janssen, Whitefish Bay, Wis.

[73] Assignee: Briggs & Stratton, Wauwatosa, Wis.

[21] Appl. No.: 607,583

[22] Filed: Nov. 1, 1990

[51] Int. Cl.⁵ .................. E05B 17/20; E05B 47/00; B60R 25/04
[52] U.S. Cl. .................. 307/10.3; 70/276; 180/287; 307/10.6; 340/825.31
[58] Field of Search .......... 70/275, 252, D13, 278, 70/276, 277, 283; 340/825.32, 825.31, 825.3, 525.5, 526; 180/279, 280, 287; 307/9.1, 10.1, 10.3, 10.6

[56] References Cited

U.S. PATENT DOCUMENTS

| | | | |
|---|---|---|---|
| 4,287,733 | 9/1981 | Gomezj-Olea | 70/278 |
| 4,427,967 | 1/1984 | Maiocco | 180/287 |
| 4,507,944 | 4/1985 | Widén et al. | 70/276 |
| 4,546,266 | 10/1985 | Zenick et al. | 307/10.2 |
| 4,603,563 | 8/1986 | Mochida et al. | 70/276 |
| 4,638,882 | 1/1987 | Sato | 180/287 |
| 4,643,009 | 2/1987 | Sato | 70/252 |
| 4,862,139 | 8/1989 | Fukamachi et al. | 340/426 |
| 4,920,338 | 4/1990 | Tsunoda et al. | 340/825.3 |
| 4,983,947 | 1/1991 | Mullen et al. | 340/426 |

Primary Examiner—Jeffrey A. Gaffin
Assistant Examiner—Richard T. Elms
Attorney, Agent, or Firm—Andrus, Sceales, Starke & Sawall

[57] ABSTRACT

A lock for the ignition circuit of an automobile is disclosed. The lock includes a Hall effect sensor element which is activated by a control magnet on the cylinder member of the lock so that when the cylinder is rotated by a key to its start position the Hall effect sensor element is activated. The activation of the sensor element provides one of several starting criteria to an ignition circuit for starting an automobile. An anti-tampering magnet on the cylinder member lies directly under the sensor element in the off position and biases the Hall effect sensor element to its off position so hard that other magnetic forces induced from the exterior of the lock cannot overcome the bias and activate the sensor.

6 Claims, 1 Drawing Sheet

ANTI-TAMPERING MAGNET FOR AUTOMOBILE IGNITION LOCK

BACKGROUND OF THE INVENTION

The present invention relates to locks, and more particularly to a lock for the ignition circuit of an automobile.

Various types of locks for use in connection with the ignition circuit of an automobile are known in the art. Many of such locks include anti-theft and/or anti-tampering mechanisms which are incorporated to deter unauthorized use of automobiles. Although many of such devices are effective for their intended purpose, there remains a need for improved devices of this type.

SUMMARY OF THE INVENTION

A lock for the ignition circuit of an automobile is disclosed. The lock includes a Hall effect sensor element which is activated by a control magnet on the cylinder member of the lock so that when the cylinder is rotated by a key to its start position the Hall effect sensor element is activated which in turn enables the ignition circuit to start an automobile. A magnet on the cylinder member lies directly under the sensor element in the off position and biases the Hall effect sensor element to its off position so hard that other magnetic forces induced from the exterior of the lock cannot overcome the bias and activate the sensor. When the key is turned in the lock, the anti-tampering magnet is rotated away from the sensor and the control magnet is rotated adjacent to the sensor to enable the sensor at the proper angular rotation.

Accordingly, the present invention provides a lock for an automobile ignition circuit, comprising a hollow sleeve defining a cylindrical inner surface; a cylinder rotatably mounted within said sleeve and having a cylindrical outer surface defining a cylindrical interface with the inner surface of said sleeve, said cylinder member having a keyway therein for receiving a key used to rotate said cylinder between off and start positions; sensor means on said sleeve for detecting when said cylinder member is rotated to its start position; means on said cylinder member for activating said sensor means when said cylinder member is rotated to its start position; means on said cylinder member for disabling said sensor means when said cylinder member is in its off position. Preferably, the activating means comprises a magnet having a south magnetic pole along the rotational interface, and the disabling means comprises a magnet having a north magnetic pole located along the interface.

BRIEF DESCRIPTION OF THE DRAWINGS

The drawings illustrate the best mode presently contemplated of carrying out the invention.

In the drawings.

DESCRIPTION OF THE PREFERRED EMBODIMENT

Figure 1:
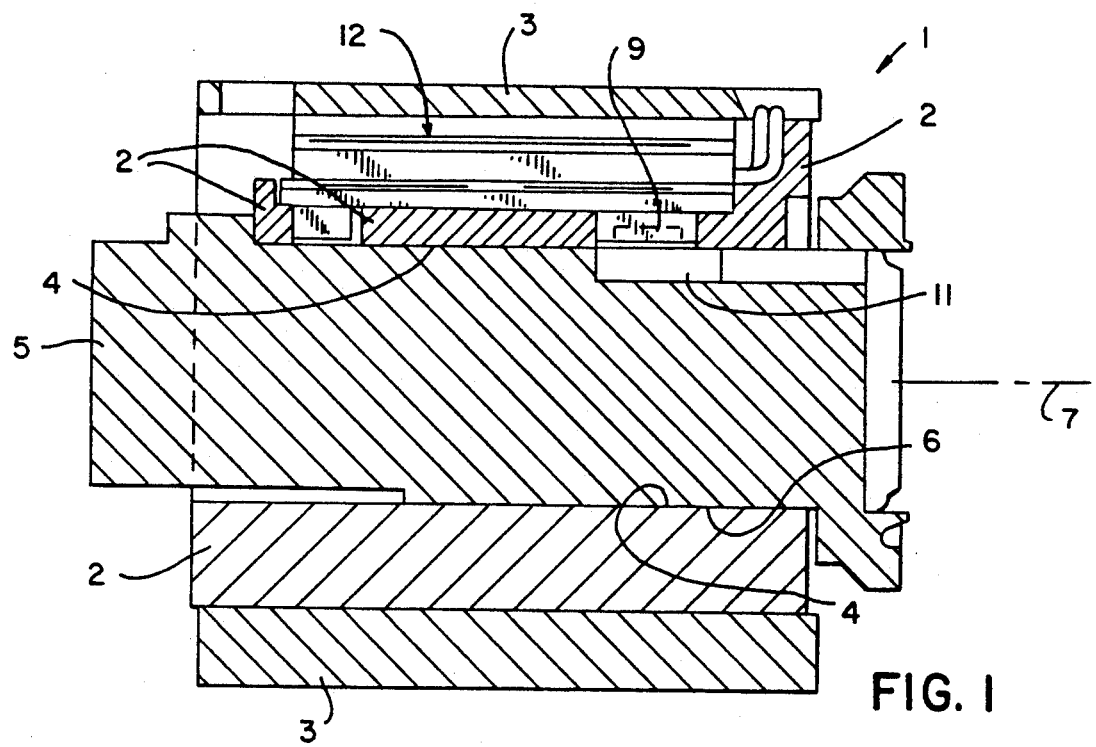
FIG. 1 is a side view in elevation of an ignition lock construction in accordance with the principles of the present invention.
Figure 2:
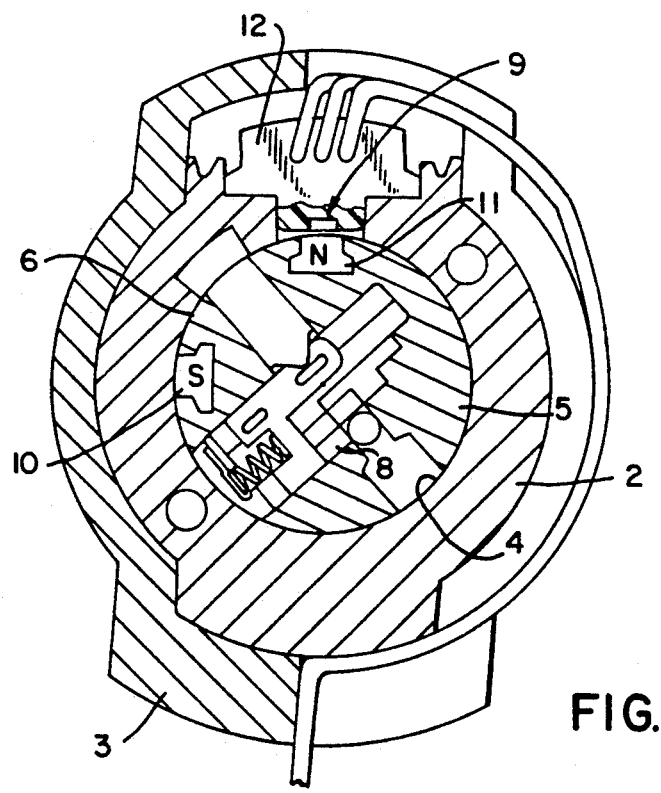
FIG. 2 is a cross sectional end view of the lock of FIG. 1.

Referring now to the drawings, FIGS. 1 and 2 illustrate an ignition lock generally designated by the numeral 1 constructed in accordance with the principles of the present invention. As illustrated, lock 1 includes a hollow cylindrical sleeve 2 which in turn is fixed within a housing 3. Housing 3 may, for example, comprise a steering column of an automobile although it is within the scope of the present invention to mount ignition lock 1 in any desired location.

Sleeve 2 includes a cylindrical inner surface 4, and receives an elongated rotatable cylinder member 5 therein. Cylinder member 5 includes a cylindrical outer surface 6 which forms a rotational interface with inner surface 4 of sleeve 2. Cylinder member 5 is rotatable about longitudinal axis 7, and includes a keyway 8 along the axis 7 for receiving a key (not shown) therein. Cylinder member 5 is rotatable between an off position, as shown in FIG. 2, and a start position wherein cylinder member 5 is rotated in a clockwise direction from the position shown in FIG. 1. After starting, cylinder 5 rotates in a counterclockwise direction from the start position to a run position, as is conventional.

A sensor element 9, preferably a Hall effect sensor device, is mounted in a sensor module 12 on sleeve 2. Sensor element 9 functions to detect the rotational position of cylinder member 5 in order to ensure that the ignition circuit for starting the engine of an automobile is operable only when a proper key is utilized to rotate cylinder member 5. In order to accomplish this, Hall effect device 9 is located along the rotational interface of surfaces 4 and 6 in order to sense a control magnet 10 located on cylinder member 5. Control magnet 10 is located along outer surface 6 and is positioned such that rotation of cylinder member 5 causes control magnet 10 to rotate past sensor 9. Magnet 10 has a south magnetic pole orientated radially outwardly at surface 6. Thus, when magnet 10 passes sensor 9, sensor 9 is activated or enabled which in turn provides one of several starting criteria to the starting module (not shown).

As a means for disabling sensor element 9 when cylinder member 5 is in its off position, lock 1 includes an anti-tampering or disabling magnet 11 located on cylinder member 5. As shown best in FIG. 2, magnet 11 is located at outer surface 6 of cylinder member 5 and is spaced from magnet 10 so that when cylinder member 5 is in its off position, magnet 11 lies directly beneath and closely adjacent to sensor 9. Magnet 11 has its north magnetic pole orientated radially outwardly so that it is positioned closely adjacent to sensor 9. Magnet 11 functions to disable sensor 9 by biasing the Hall effect sensor 9 off so hard that other magnetic forces induced from the outside of housing 3 cannot overcome the biasing effect of magnet 11 and enable or activate sensor 9. Magnet 11 thus shifts the flux density curve for Hall effect device 9 such that magnetic forces applied from the exterior of housing 3 would be insufficient to enable sensor 9.

In operation, an operator of an automobile would first insert the appropriate key into cylinder member 5 and rotate cylinder member 5 in a clockwise direction until magnet 10 passes sensor 9, at which time sensor 9 is enabled or activated. When the cylinder member 5 is returned to its off position, i.e., the position shown in FIG. 2, magnet 11 lies directly beneath sensor 9 and biases the magnetic flux applied to sensor 9 north which provides a decrease in the south going flux density sensed by sensor 9. Thus, upon removal of a key by the operator, external magnetic forces cannot activate or enable sensor 9.

Various modes of carrying out the invention are contemplated as being within the scope of the following claims particularly pointing out and distinctly claiming the subject matter which is regarded as the invention.

I claim:

1. A lock for an automobile ignition circuit, comprising:
   a hollow sleeve defining a cylindrical inner surface;
   a cylinder member rotatably mounted within said sleeve and having a cylindrical outer surface defining a cylindrical interface with the inner surface of said sleeve, said cylinder member having a keyway therein for receiving a key used to rotate said cylinder between off and start positions;
   sensor means on said sleeve for detecting when said cylinder member is rotated to its start position;
   means on said cylinder member for activating said sensor means when said cylinder member is rotated to its start position; and
   means on said cylinder member for disabling said sensor means when said cylinder member is in its off position,
   wherein said sensor means is a Hall effect device and said activating means and disabling means are magnets, and
   wherein said magnet of said disabling means is located directly adjacent to said Hall effect device when said cylinder member is in its off position.

2. The lock of claim 1, wherein said sensor means, activating means and disabling means are all located along said interface.

3. The lock of claim 1, wherein said magnet of said activating means has a south magnet pole located at said interface, and said magnet of said disabling means has a north magnetic pole located at said interface.

4. A lock for an automobile ignition circuit, comprising;
   a hollow sleeve defining a cylindrical inner surface;
   cylinder member rotatably mounted within said sleeve and having a cylindrical outer surface defining a cylindrical interface with the inner surface of said sleeve, said cylinder member having a keyway therein for receiving a key used to rotate said cylinder between off and start positions;
   sensor means on said sleeve for detecting when said cylinder member is rotated to its start position;
   means on said cylinder member for activating said sensor means when said cylinder member is rotated to its start position; and
   means on said cylinder member for disabling said sensor means when said cylinder member is in its off position,
   wherein said sensor means is a magnetically responsive sensor and said activating means and disabling means are magnets, and
   wherein said magnet of said disabling means is located directly adjacent to said magnetically responsive sensor when said cylinder member is in its off position.

5. The lock of claim 4, wherein said sensor means, activating means and disabling means are all located along said interface.

6. The lock of claim 4, wherein one of said magnets has a south magnetic pole located at said interface, and the other of said magnets has a north magnetic pole located at said interface.

* * * * *